(12) United States Patent
Shriver

(10) Patent No.: US 8,566,574 B2
(45) Date of Patent: Oct. 22, 2013

(54) SECURE ENCRYPTED BOOT WITH SIMPLIFIED FIRMWARE UPDATE

(75) Inventor: John Adam Shriver, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 12/964,091

(22) Filed: Dec. 9, 2010

(65) Prior Publication Data
US 2012/0151199 A1 Jun. 14, 2012

(51) Int. Cl.
*G06F 12/14* (2006.01)
(52) U.S. Cl.
USPC .............................................. 713/2; 713/189
(58) Field of Classification Search
USPC ................................................. 713/2, 193, 189
See application file for complete search history.

(56) References Cited

U.S. PATENT DOCUMENTS

| | | | |
|---|---|---|---|
| 6,976,163 B1 | 12/2005 | Hind et al. | 713/156 |
| 7,069,452 B1 | 6/2006 | Hind et al. | 713/200 |
| 7,343,493 B2* | 3/2008 | Challener et al. | 713/193 |
| 8,127,146 B2* | 2/2012 | Thom et al. | 713/189 |
| 2005/0021968 A1 | 1/2005 | Zimmer et al. | 713/176 |
| 2005/0182952 A1* | 8/2005 | Shinozaki | 713/189 |
| 2006/0161784 A1 | 7/2006 | Hunter et al. | 713/182 |
| 2007/0061562 A1 | 3/2007 | Zimmer et al. | 713/2 |
| 2009/0319782 A1* | 12/2009 | Lee | 713/156 |
| 2010/0268967 A1* | 10/2010 | Senda | 713/193 |

OTHER PUBLICATIONS

Parno, "The Trusted Platform Module (TPM) and Sealed Storage," EMC Corporation, Jun. 2007, 3 pages.
Henricks, et al., "Secure Bootstrap is Not Enough: Shoring Up the Trusted Computing Base," Proceedings of the Eleventh SIGOPS European Workshop, ACM SIGOPS, Sep. 2004, 5 pages.
Santos, et al., "Towards Trusted Cloud Computing," Max Planck Institute for Software Systems, 2008-2009, 5 pages.
"AVR230: DES Bootloader," Atmel Corporation, 2005, 24 pages.
"BitLocker Drive Encryption," Wikipedia, Nov. 18, 2010.

* cited by examiner

*Primary Examiner* — Carl Colin
*Assistant Examiner* — Mohammad A Siddiqi
(74) *Attorney, Agent, or Firm* — VanLeeuwen & VanLeeuwen; Jeffrey S. LaBaw

(57) ABSTRACT

An approach is provided in which a security module, such as a TPM, identifies a change to a boot configuration used in a secure boot operation. This identification results in a non-release of a secret value that is stored in a memory controlled by the security module. The non-release of the secret value is detected by a boot process when the boot process is initiating a session of the information handling system. In response to the detection by the boot process, the boot process retrieves an update encryption key and then decrypts an update copy of a disk encryption key stored on a nonvolatile storage area of the information handling system using the retrieved update encryption key. The nonvolatile storage area also includes a primary copy of the disk encryption key that has been encrypted with the secret value.

20 Claims, 6 Drawing Sheets

SECURE ENCRYPTED BOOT WITH SIMPLIFIED FIRMWARE UPDATE

TECHNICAL FIELD

The present invention relates to an encrypted booting process that allows updates to firmware and software. More particularly, the present invention relates to updating firmware and software on a system that uses a Trusted Platform Module (TPM).

BACKGROUND OF THE INVENTION

Full disk encryption uses disk encryption technology embedded in hardware or software to encrypt data stored on a nonvolatile storage device, such as a hard disk drive. Encrypting the data makes the data essentially unreadable when unauthorized access to the disk is attempted. Full disk encryption entails encrypting all data on the disk or partition, including operating system code.

A challenge faced during the secure boot of a system with encrypted disk is during the boot process of a system that has updates made to the boot code. The secure boot process validates that software executed up to the point of decrypting the disk and running the software on the encrypted disk is unchanged using previously stored hashes of the previous code and configuration. The concepts of the Trusted Computing Group, and more particularly, a Trusted Platform Module (TPM) in a computer system, is a hardware mechanism used to securely generate and store the hash values during the boot process. Once the boot code (e.g., BIOS, etc.) is updated, the secure boot process will recognize that the boot code has changed and will be unable to complete boot process. While this recognition will thwart a malicious user's tampering with the boot code to gain access to the encrypted data, it also hampers authorized updates to the boot code that may be needed due to software bugs and the like.

SUMMARY

An approach is provided in which a security module, such as a TPM, detects a change to a boot configuration used in a secure boot operation. This detection results in a non-release of a secret value that is stored in a memory controlled by the security module. The non-release of the secret value is detected by a boot process when the boot process is initiating a session of the information handling system. In response to the detection by the boot process, the boot process retrieves an update encryption key and then decrypts an update copy of a disk encryption key stored on a nonvolatile storage area of the information handling system using the retrieved update encryption key. The nonvolatile storage area also includes a primary copy of the disk encryption key that has been encrypted with the secret value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
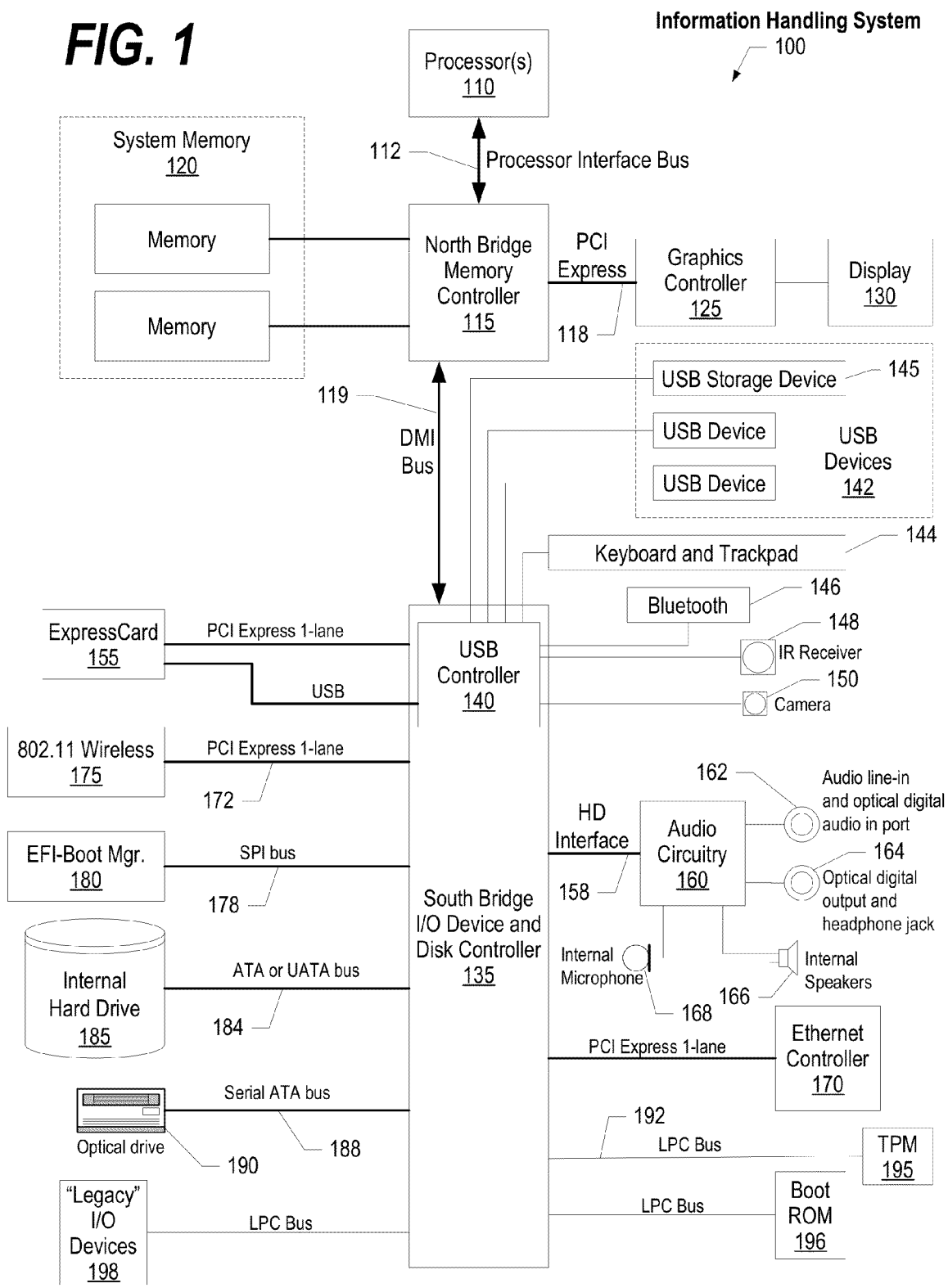
FIG. 1 is a block diagram of a data processing system in which the methods described herein can be implemented.
Figure 2:
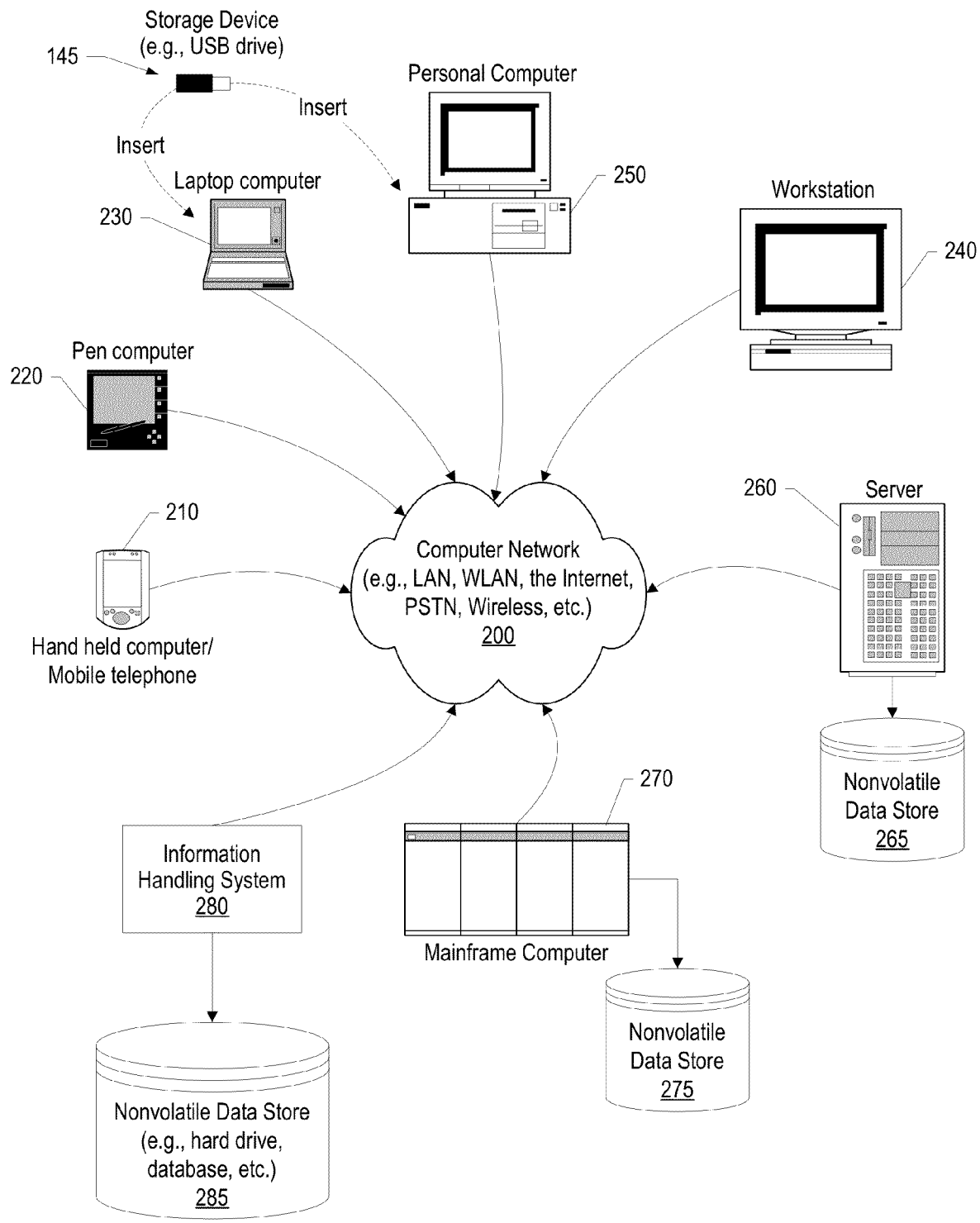
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184. In addition, the LPC bus also connects Southbridge 135 to Trusted Platform Module (TPM) 195.

TPM 195 offers facilities for the secure generation of cryptographic keys, and limitation of their use, in addition to a hardware pseudo-random number generator. The TPM includes capabilities such as remote attestation and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the chip during its production, or another trusted key descended from it. "Sealing" encrypts data similar to binding, but in addition specifies a state in which the TPM must be in order for the data to be decrypted (unsealed).

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
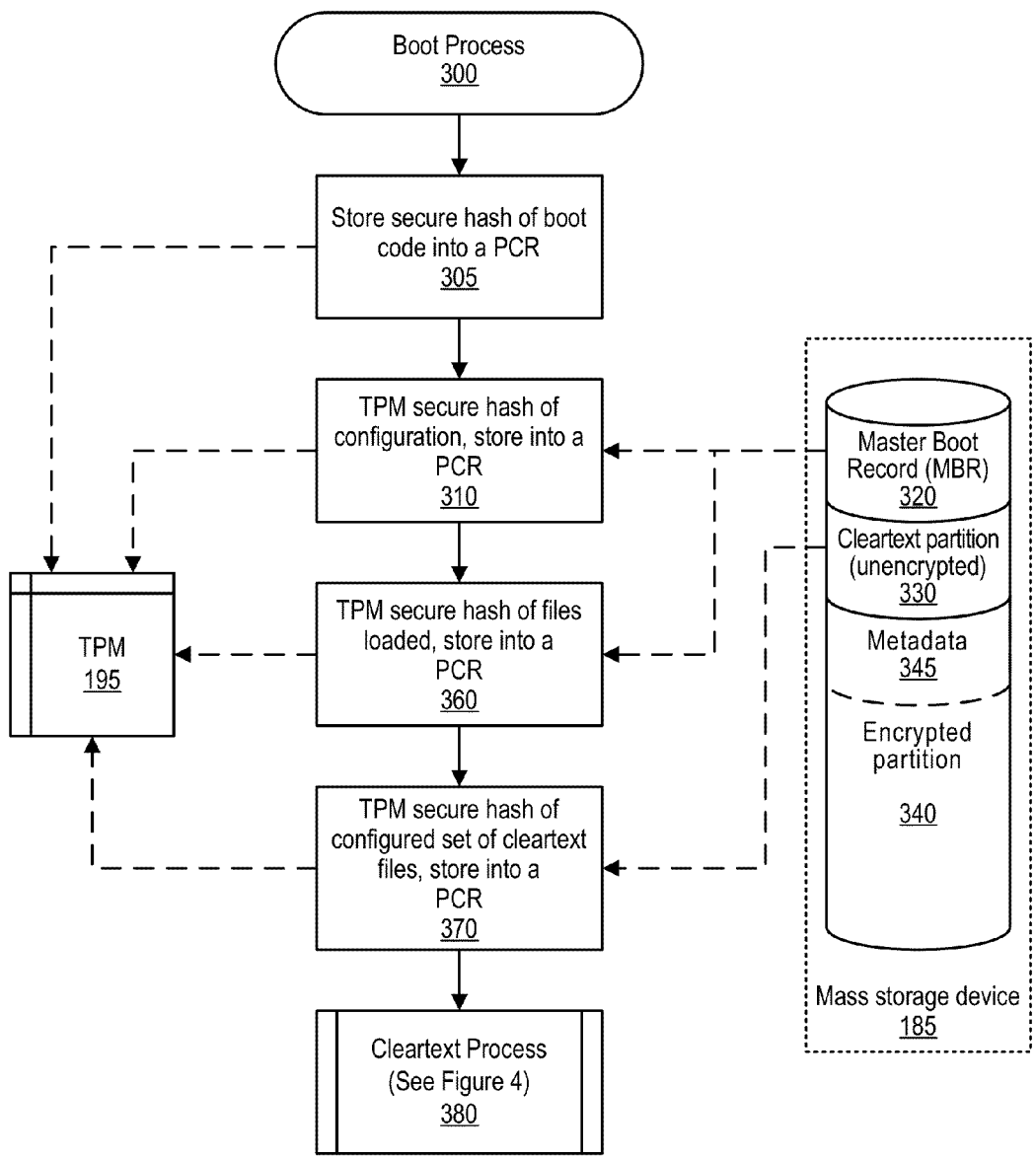
FIG. 3 is a flowchart showing the overall secure boot process.

FIG. 3 is a flowchart showing the overall secure boot process. Processing commences at 300 whereupon, at step 305, a secure hash of boot code is stored into one or more Platform Configuration Registers (PCRs) included in Trusted Platform Module (TPM) 195. At step 310, the boot process performs a TPM secure hash of the boot configuration from Master Boot Record (MBR) 320 of nonvolatile storage device 185 and stores the value into one or more PCRs. Note that nonvolatile storage device includes MBR 320 which is unencrypted data, cleartext partition 330 which also includes unencrypted data, crypto process metadata 345 that includes encrypted copies of a disk encryption key, and encrypted partition 340 which includes encrypted data that is accessed by the crypto process using the disk encryption key. As used herein, "boot configuration" can include both the configuration of the information handling system as well as the code executed during the boot process.

At step 360, the boot process performs a TPM secure hash of the files loaded during the boot process and stores the resulting hash value into one or more PCRs in TPM 195. At step 370, the boot process performs a secure hash of a configured set of cleartext (unencrypted) files used to boot the operating system and stores the resulting hash value into one or more PCRs. At predefined process 380, the cleartext process is invoked in order to load and boot the operating system (see FIG. 4 and corresponding text for processing details).

Figure 4:
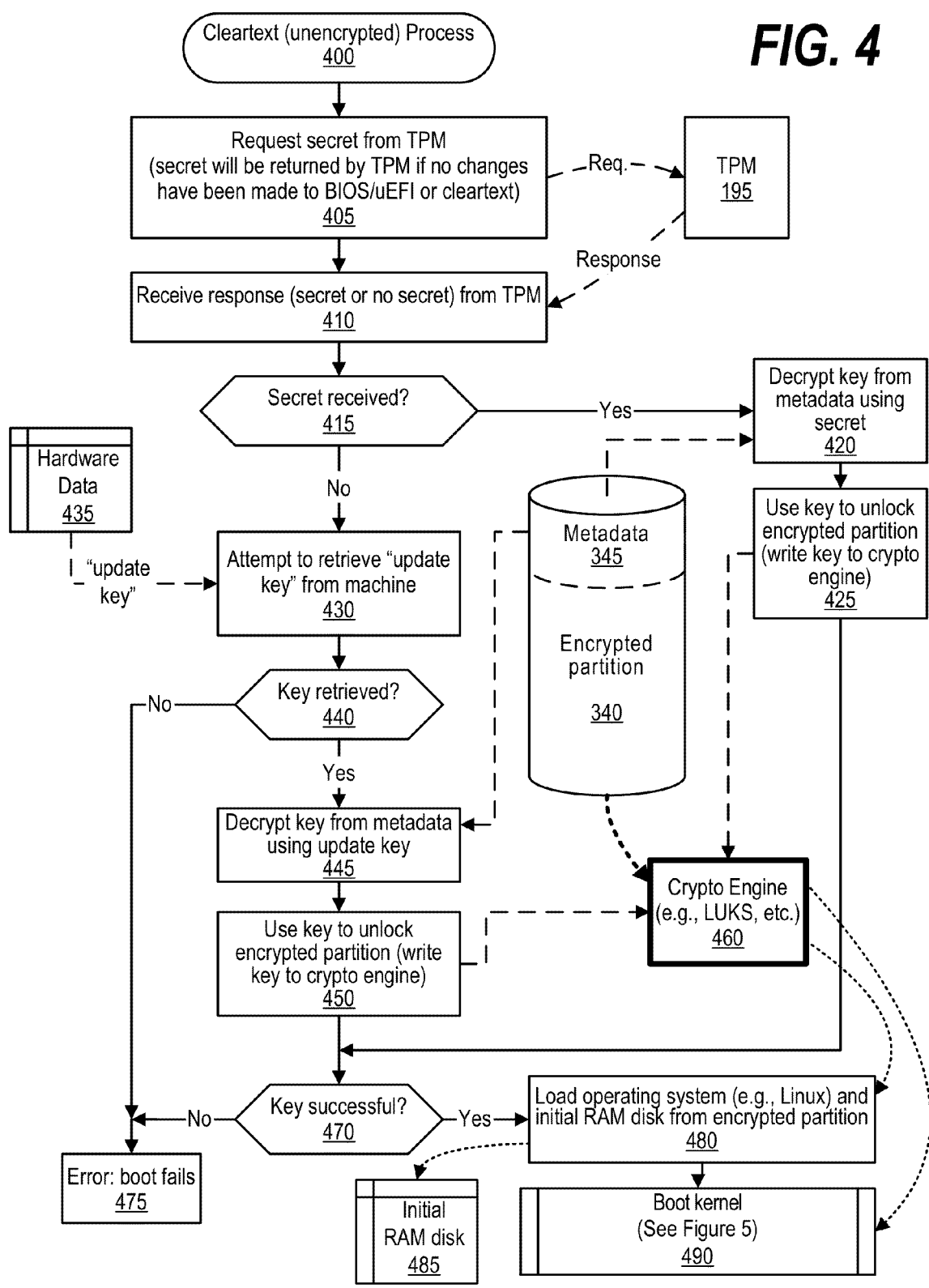
FIG. 4 is a flowchart showing steps performed by the unencrypted (cleartext) boot process.

FIG. 4 is a flowchart showing steps performed by the unencrypted (cleartext) boot process. Processing commences at 400 whereupon, at step 405, the cleartext (unencrypted) process requests a secret value from Trusted Platform Module (TPM) 195. The secret value that is stored in TPM 195 was previously secured, or "sealed," using PCR values that were in place at the time the value was sealed. If no changes have been made to the boot configuration (e.g., Basic Input Output System (BIOS), Unified Extensible Firmware Interface (uEFI), cleartext boot partition, etc), then the secret value will be released by the TPM to the cleartext process. However, if the boot configuration has been altered (e.g., boot files updated, etc.), then the PCR values will not match and the TPM will not release the secret value (a non-release of the secret value). At step 410, a response is received from the TPM. As described above, depending on whether the boot configuration has been altered, the TPM will either release the secret value or it will not release the secret value.

A determination is made as to whether the TPM released the secret value, indicating that the boot configuration has not been altered (decision 415). If the TPM released the secret value, then decision 415 branches to the "yes" branch whereupon, at step 420, the secret value is used to decrypt an encrypted copy of the disk encryption key that is stored in metadata 345. This is the primary copy of the disk encryption key. At step 425, the decrypted disk encryption key is used to unlock encrypted partition 340. In one embodiment, the unlocking is performed by providing the disk encryption key to crypto engine software application 460 (e.g., LUKS, etc.) that is responsible for reading data from encrypted partition 340 and writing (encrypting) data to encrypted partition 340.

Returning to decision 415, if a non-release of the secret value is detected, then decision 415 branches to the "no" branch whereupon, at step 430, the boot process attempts to retrieve an update encryption key from another source, such as from unique hardware data 435. In other embodiments, the update encryption key could be retrieved from the user (e.g., a password, pass phrase, etc.) or from some other input. A determination is made as to whether the update encryption key is retrieved (decision 440). If the update encryption key was not retrieved, then decision 440 branches to the "no" branch whereupon, at step 475, an error occurs and the boot process fails. On the other hand, if the update encryption key is retrieved, then decision 440 branches to the "yes" branch whereupon, at step 445, the update encryption key is used to decrypt an encrypted copy of the disk encryption key that is stored in metadata 345. This is the update copy of the disk encryption key. At step 440, the decrypted disk encryption key is used to unlock encrypted partition 340. In one embodiment, the unlocking is performed by providing the disk encryption key to crypto engine software application 460 (e.g., LUKS, etc.) that is responsible for reading data from encrypted partition 340 and writing (encrypting) data to encrypted partition 340.

After the disk encryption key has been retrieved and decrypted from metadata 345, a determination is made as to whether the disk encryption key was successful (decision 470). If the disk encryption key is not successful (does not decrypt data stored on encrypted partition 340), then decision 470 branches to the "no" branch whereupon, at step 475 an error occurs and the boot operation fails. On the other hand, if the disk encryption key was successful, then decision 470 branches to the "yes" branch whereupon, at step 480, an encrypted copy of the operating system kernel (the "kernel") is decrypted and loaded from encrypted partition 340. In one embodiment, an initial RAM disk that is used by the operating system is also retrieved and decrypted from encrypted partition 340. As known by those skilled in the art, a RAM disk is a block of RAM (primary storage or volatile memory) that the information handling system treats as if the memory were a disk drive (secondary storage). In this embodiment, the initial RAM disk is preloaded from a filesystem image that is provided when the system is booted. When the kernel first boots, it does not yet have the disk encryption key needed to store and retrieve files to/from encrypted partition 340. During the kernel boot process (predefined process 490, details of which are shown in FIG. 5), the kernel retrieves the disk encryption key using either the secret value (if the boot configuration has not been altered) or using the update encryption key (if the boot configuration has been altered).

Figure 5:
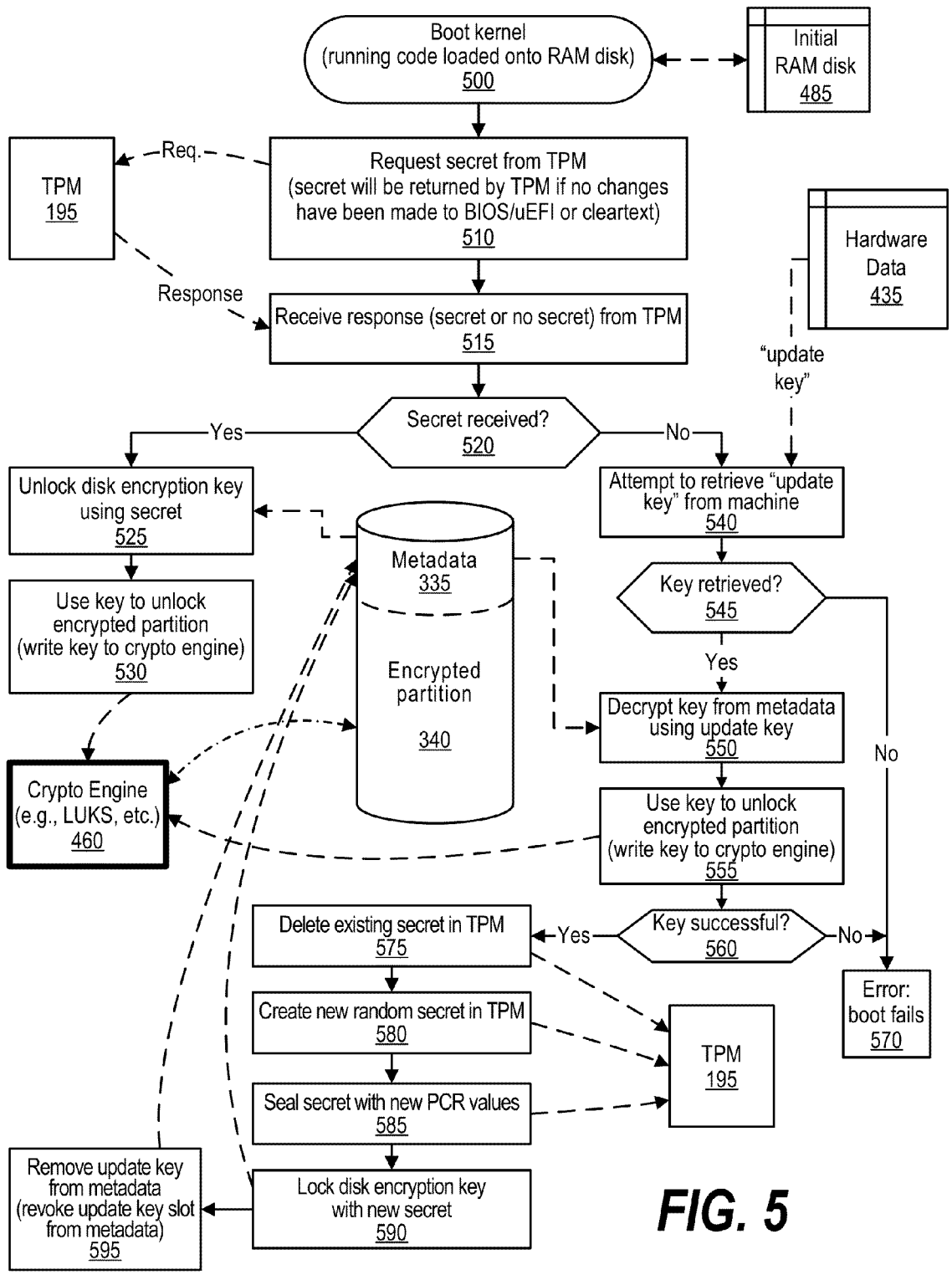
FIG. 5 is a flowchart showing steps performed by the unencrypted operating system kernel which is loaded and booted from a RAM disk.

FIG. 5 is a flowchart showing steps performed by the unencrypted operating system kernel which was retrieved from encrypted partition 340. Because the kernel has not yet retrieved the disk encryption key it is unable to use encrypted partition 340. Therefore, initial RAM disk 485 is used by the kernel until the disk encryption key is known. Initial RAM disk 485 is a RAM disk that is preloaded from a filesystem image that is provided when the kernel is booted. The boot sequence shown in FIG. 5 executes from initial RAM disk 485 until the kernel can decrypt encrypted partition 340 using the disk encryption key. When the encrypted partition is available (after the disk encryption key is found by the kernel boot process as described below), the boot process is able to jump from executing code on the initial RAM disk to executing code residing on encrypted partition 340.

Kernel boot processing commences at 500 whereupon, at step 510, the kernel requests the secret value from Trusted Platform Module (TPM) 195 and receives a response at step 515, similar to the request made by the cleartext process shown in FIG. 4. A determination is made as to whether the TPM releases the secret value (decision 520). As previously described, the TPM will not release the secret value if a change in the boot configuration is detected based on the hash values loaded into the TPM's PCRs. If the hash values stored in the PCRs during the boot process do not match expected hash values previously stored in the TPM, then the TPM will not release the secret value (a non-release of the secret value). If the secret value is released by the TPM, then decision 520 branches to the "yes" branch whereupon, at step 525, the kernel boot process uses the secret value to unlock (decrypt) a primary copy of the disk encryption key stored in metadata 335. At step 530, the retrieved and decrypted disk encryption key is used to unlock encrypted partition 340. As previously described, in one embodiment the encrypted partition is unlocked by providing the disk encryption key to crypto engine process software 460 (e.g., LUKS, etc.) that is responsible for managing encrypted partition 340 by writing (encrypting) files to the encrypted partition and reading (decrypting) files from the encrypted partition.

Returning to decision 520, if a non-release of the secret value is detected, then decision 520 branches to the "no" branch whereupon, at step 540, the kernel boot process attempts to retrieve an update encryption key from another source, such as from unique hardware data 435. In other embodiments, the update encryption key could be retrieved from the user (e.g., a password, pass phrase, etc.) or from some other input. A determination is made as to whether the update encryption key is retrieved (decision 545). If the update encryption key was not retrieved, then decision 545 branches to the "no" branch whereupon, at step 570, an error occurs and the kernel boot process fails. On the other hand, if the update encryption key is retrieved, then decision 545 branches to the "yes" branch whereupon, at step 550, the received update encryption key is used to decrypt an encrypted copy of the disk encryption key that is stored in metadata 345. This is the update copy of the disk encryption key. At step 555, the decrypted disk encryption key is used to unlock encrypted partition 340. In one embodiment, as previously described, the unlocking is performed by providing the disk encryption key to crypto engine software application 460 (e.g., LUKS, etc.) that is responsible for reading data (decrypting) from encrypted partition 340 and writing (encrypting) data to encrypted partition 340.

A determination is made as to whether the disk encryption key was successful (decision 560). If the disk encryption key is not successful (does not decrypt data stored on encrypted partition 340), then decision 560 branches to the "no" branch whereupon, at step 570 an error occurs and the kernel boot operation fails. On the other hand, if the disk encryption key was successful, then decision 560 branches to the "yes" branch that performs steps to update the secret value stored in the TPM.

At step 575, the kernel boot process (running in a secure mode), deletes the existing secret value stored in TPM 195. At step 580, a new secret value is generated (e.g., using the TPM's random number generator, etc.) and stored in TPM 195. The new secret value is now sealed at step 585 using the PCR values that resulted from the new (updated) configuration being booted (e.g., the hash values taken of the updated boot configuration). At step 590, the primary copy of the disk encryption key is encrypted using the new secret value and the encrypted primary copy of the disk encryption key is stored in metadata 335, replacing the old primary copy of the disk encryption key that was encrypted using the old secret value. At step 595, the update key is deleted in the metadata 335, preventing unauthorized changes of the code and configuration protected by the TPM 195.

Figure 6:
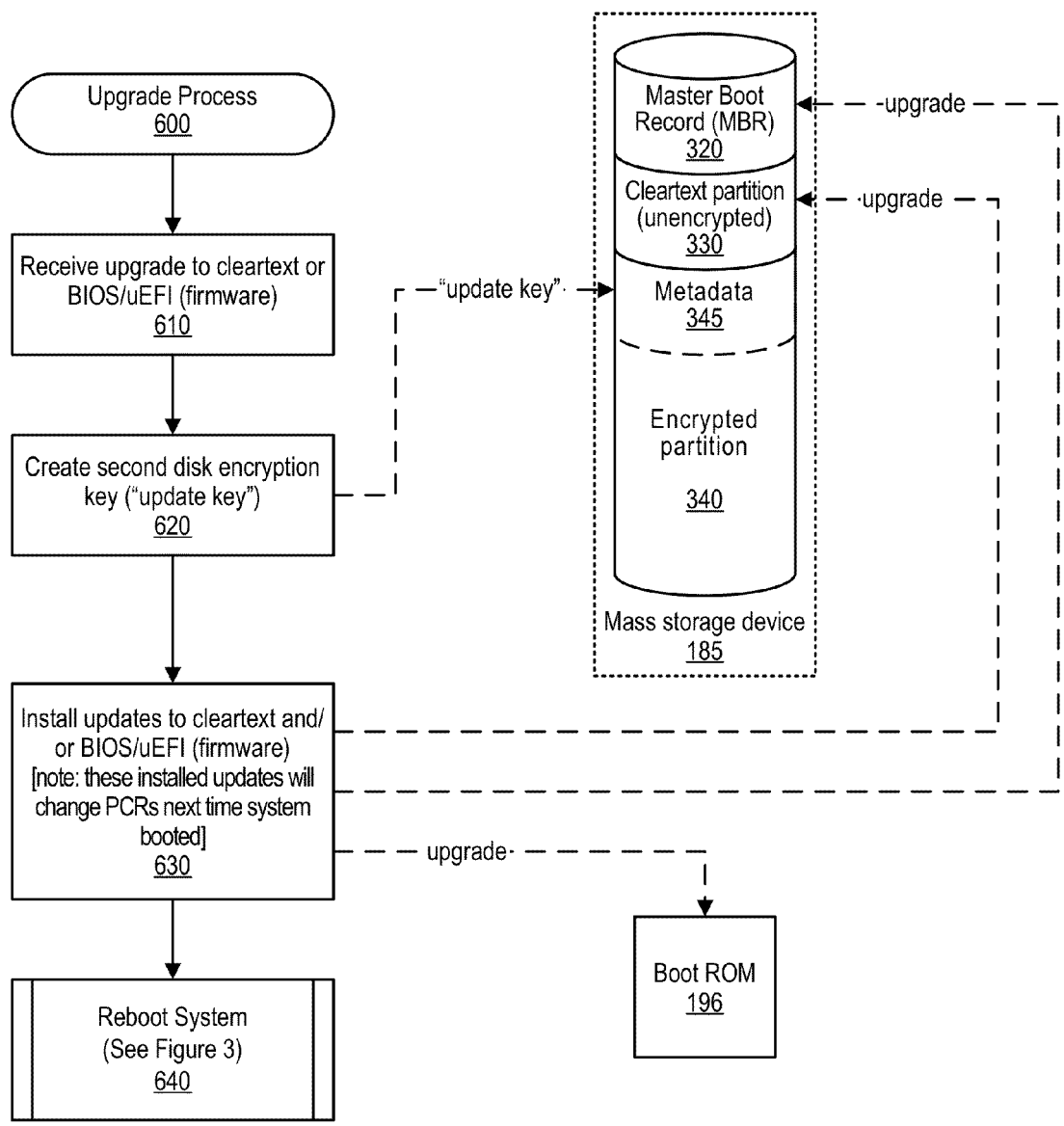
FIG. 6 is a flowchart showing the update process used to update secure boot files.

FIG. 6 is a flowchart showing the update process used to update secure boot files. Processing commences at 600 whereupon, at step 610, one or more upgrades are received to the boot configuration (e.g., cleartext files, BIOS files, uEFI (firmware) files, etc.). At step 620, a copy of the disk encryption key is encrypted using an update encryption key with the encryption resulting in an update copy of the disk encryption key which is stored in metadata 345. As previously described, the update encryption key can be received from various sources, such as from unique hardware data 435 or, in other embodiments, the update encryption key could be retrieved from the user (e.g., a password, pass phrase, etc.) or from some other input.

At step 630, updates are installed to the unencrypted boot portions of the boot configuration, such as the cleartext, master boot record (MBR), BIOS, uEFI, Boot ROM 196, and the like. These installed updates will change the PCRs the next time that the system is booted resulting in a non-release of the secret value from the TPM. The boot process (shown in FIGS. 4 and 5) will then use the update encryption key to gain access to the disk encryption key in order to unlock encrypted partition and ultimately update the secret value as shown and described in FIG. 5. At step 640, the system is rebooted (see FIG. 3 and corresponding text for processing details which then invokes the boot processes shown in FIGS. 4 and 5).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:

detecting, by a security module, a change to a boot configuration used in a secure boot operation, the detection resulting in a non-release of a secret value stored in a memory controlled by the security module;
identifying, by a boot process, the non-release of the secret value, wherein the boot process is initiating a session of the information handling system;
in response to the identification of the non-release of the secret value:
retrieving an update encryption key; and
decrypting an update copy of a disk encryption key stored on a nonvolatile storage area of the information handling system using the retrieved update encryption key, wherein the nonvolatile storage area also includes a primary copy of the disk encryption key encrypted with the secret value.

2. The method of claim 1 further comprising:
during one or more previous sessions of the information handling system while the information handling system was operating in a secure mode:
receiving the update encryption key;
encrypting the disk encryption key with the received update encryption key;
storing the encrypted disk encryption key in the nonvolatile storage area;
updating one or more files included in the boot configuration; and
rebooting the information handling system in order to invoke the boot process.

3. The method of claim 1 further comprising:
decrypting one or more executable code segments using the decrypted disk encryption key, wherein the executable code segments are stored on an encrypted partition;
deleting the secret value stored in the memory that is controlled by the security module;
generating a new secret value;
storing the new secret value in the memory that is controlled by the security module, wherein the new secret value is sealed with one or more hash values based on an updated boot configuration that is based in part on the one or more updated files included in the boot configuration; and
encrypting the disk encryption key using the new secret value, the encrypting resulting in a new primary copy of the disk encryption key, wherein the new primary copy of the disk encryption key replaces the primary copy of the disk encryption key.

4. The method of claim 3 further comprising:
invoking the executable code segments, wherein the decrypted executable code segments perform the decrypting, deleting, generating, storing, and encrypting steps, wherein prior to the deleting of the secret value the decrypted executable code segments perform additional steps comprising:
attempting to retrieve the secret value from the security module, wherein the decrypted kernel fails to retrieve the secret value from the security module because of the change to the boot configuration;
in response to the failed attempt:
retrieving the update encryption key; and
decrypting the update copy of the disk encryption key stored on the nonvolatile storage area of the information handling system using the retrieved update encryption key.

5. The method of claim 3 wherein the executable code segments include an operating system kernel and wherein the method further comprises:

retrieving an encrypted copy of an initial RAM disk from the encrypted partition; and
decrypting the initial RAM disk using the decrypted disk encryption key and storing the decrypted initial RAM disk in a memory area, wherein the decrypted initial RAM disk includes a filesystem that is used by the operating system kernel during a boot phase.

6. The method of claim 5 wherein the update copy of the disk encryption key and the primary copy of the disk encryption key are stored in a nonvolatile data area associated with the crypto engine software application.

7. The method of claim 1 further comprising:
providing the decrypted disk encryption key to a crypto engine software application that uses the disk encryption key to store files to an encrypted nonvolatile partition and to retrieve files from the encrypted nonvolatile partition.

8. An information handling system comprising:
one or more processors;
a memory coupled to at least one of the processors;
a Trusted Platform Module (TPM) accessible by at least one of the processors, wherein the TPM includes a memory controlled by the TPM;
a secret value stored in the memory controlled by the TPM;
a nonvolatile storage that include one or more encrypted partition; and
a set of instructions stored in the memory and executed by at least one of the processors in order to perform actions of:
detecting, by the TPM, a change to a boot configuration used in a secure boot operation, the detection resulting in a non-release of a secret value stored in a memory controlled by the TPM;
identifying, by a boot process, the non-release of the secret value, wherein the boot process is initiating a session of the information handling system;
in response to the identification of the non-release of the secret value:
retrieving an update encryption key; and
decrypting an update copy of a disk encryption key stored on the nonvolatile storage using the retrieved update encryption key, wherein the nonvolatile storage also includes a primary copy of the disk encryption key encrypted with the secret value.

9. The information handling system of claim 8 wherein the processors perform further actions comprising:
during one or more previous sessions of the information handling system while the information handling system was operating in a secure mode:
receiving the update encryption key;
encrypting the disk encryption key with the received update encryption key;
storing the encrypted disk encryption key in the nonvolatile storage;
updating one or more files included in the boot configuration; and
rebooting the information handling system in order to invoke the boot process.

10. The information handling system of claim 8 wherein the processors perform further actions comprising:
decrypting one or more executable code segments using the decrypted disk encryption key, wherein the executable code segments are stored on the encrypted partition;
deleting the secret value stored in the memory that is controlled by the security module;
generating a new secret value;

storing the new secret value in the memory that is controlled by the security module, wherein the new secret value is sealed with one or more hash values based on an updated boot configuration that is based in part on the one or more updated files included in the boot configuration; and encrypting the disk encryption key using the new secret value, the encrypting resulting in a new primary copy of the disk encryption key, wherein the new primary copy of the disk encryption key replaces the primary copy of the disk encryption key.

11. The information handling system of claim 10 wherein the processors perform further actions comprising:

invoking the executable code segments, wherein the decrypted executable code segments perform the decrypting, deleting, generating, storing, and encrypting steps, wherein prior to the deleting of the secret value the decrypted executable code segments perform additional steps comprising:

attempting to retrieve the secret value from the security module, wherein the decrypted kernel fails to retrieve the secret value from the security module because of the change to the boot configuration;

in response to the failed attempt:
retrieving the update encryption key; and
decrypting the update copy of the disk encryption key stored on the nonvolatile storage area of the information handling system using the retrieved update encryption key.

12. The information handling system of claim 10 wherein the executable code segments include an operating system kernel and wherein the method further comprises:

retrieving an encrypted copy of an initial RAM disk from the encrypted partition; and decrypting the initial RAM disk using the decrypted disk encryption key and storing the decrypted initial RAM disk in a memory area, wherein the decrypted initial RAM disk includes a filesystem that is used by the operating system kernel during a boot phase.

13. The information handling system of claim 12 wherein the update copy of the disk encryption key and the primary copy of the disk encryption key are stored in a nonvolatile data area associated with the crypto engine software application.

14. The information handling system of claim 8 wherein the processors perform further actions comprising:

providing the decrypted disk encryption key to a crypto engine software application that uses the disk encryption key to store files to an encrypted nonvolatile partition and to retrieve files from the encrypted nonvolatile partition.

15. A computer program product stored in a computer readable storage device, comprising functional descriptive material that, when executed by an information handling system, causes the information handling system to perform actions comprising:

detecting, by a security module, a change to a boot configuration used in a secure boot operation, the detection resulting in a non-release of a secret value stored in a memory controlled by the security module;

identifying, by a boot process, the non-release of the secret value, wherein the boot process is initiating a session of the information handling system;

in response to the identification of the non-release of the secret value:
retrieving an update encryption key; and
decrypting an update copy of a disk encryption key stored on a nonvolatile storage area of the information handling system using the retrieved update encryption key, wherein the nonvolatile storage area also includes a primary copy of the disk encryption key encrypted with the secret value.

16. The computer program product of claim 15 wherein the functional descriptive material, when executed by an information handling system, causes the information handling system to perform additional actions comprising:

during one or more previous sessions of the information handling system while the information handling system was operating in a secure mode:
receiving the update encryption key;
encrypting the disk encryption key with the received update encryption key;
storing the encrypted disk encryption key in the nonvolatile storage area;
updating one or more files included in the boot configuration; and
rebooting the information handling system in order to invoke the boot process.

17. The computer program product of claim 15 wherein the functional descriptive material, when executed by an information handling system, causes the information handling system to perform additional actions comprising:

decrypting one or more executable code segments using the decrypted disk encryption key, wherein the executable code segments are stored on an encrypted partition;

deleting the secret value stored in the memory that is controlled by the security module;

generating a new secret value;

storing the new secret value in the memory that is controlled by the security module, wherein the new secret value is sealed with one or more hash values based on an updated boot configuration that is based in part on the one or more updated files included in the boot configuration; and encrypting the disk encryption key using the new secret value, the encrypting resulting in a new primary copy of the disk encryption key, wherein the new primary copy of the disk encryption key replaces the primary copy of the disk encryption key.

18. The computer program product of claim 17 wherein the functional descriptive material, when executed by an information handling system, causes the information handling system to perform additional actions comprising:

invoking the executable code segments, wherein the decrypted executable code segments perform the decrypting, deleting, generating, storing, and encrypting steps, wherein prior to the deleting of the secret value the decrypted executable code segments perform additional steps comprising:

attempting to retrieve the secret value from the security module, wherein the decrypted kernel fails to retrieve the secret value from the security module because of the change to the boot configuration;

in response to the failed attempt:
retrieving the update encryption key; and
decrypting the update copy of the disk encryption key stored on the nonvolatile storage area of the information handling system using the retrieved update encryption key.

19. The computer program product of claim 17 wherein the executable code segments include an operating system kernel and wherein the functional descriptive material, when executed by an information handling system, causes the information handling system to perform additional actions comprising:

retrieving an encrypted copy of an initial RAM disk from the encrypted partition; and decrypting the initial RAM disk using the decrypted disk encryption key and storing the decrypted initial RAM disk in a memory area, wherein the decrypted initial RAM disk includes a filesystem that is used by the operating system kernel during a boot phase.

20. The computer program product of claim 15 wherein the functional descriptive material, when executed by an information handling system, causes the information handling system to perform additional actions comprising:

providing the decrypted disk encryption key to a crypto engine software application that uses the disk encryption key to store files to an encrypted nonvolatile partition and to retrieve files from the encrypted nonvolatile partition.

\* \* \* \* \*